United States Patent Office 2,831,560
Patented Apr. 22, 1958

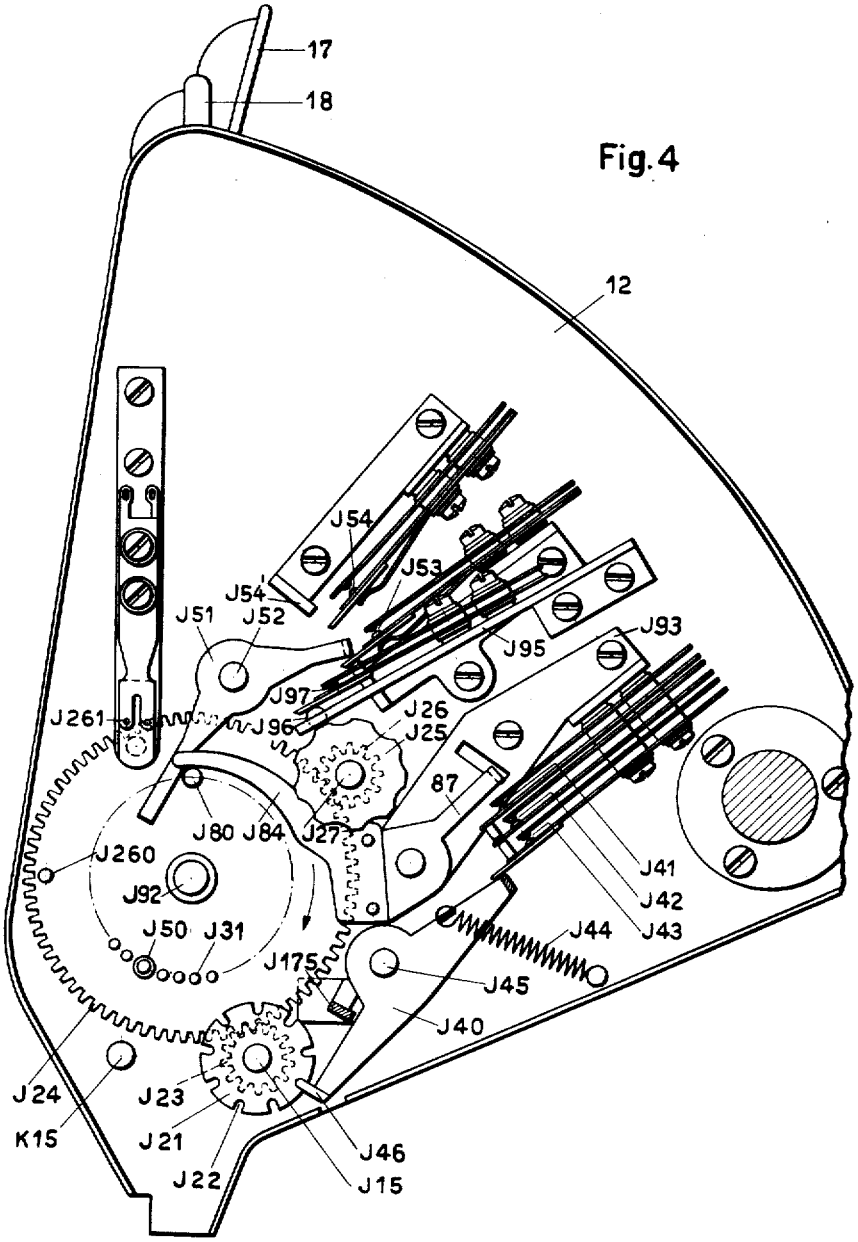

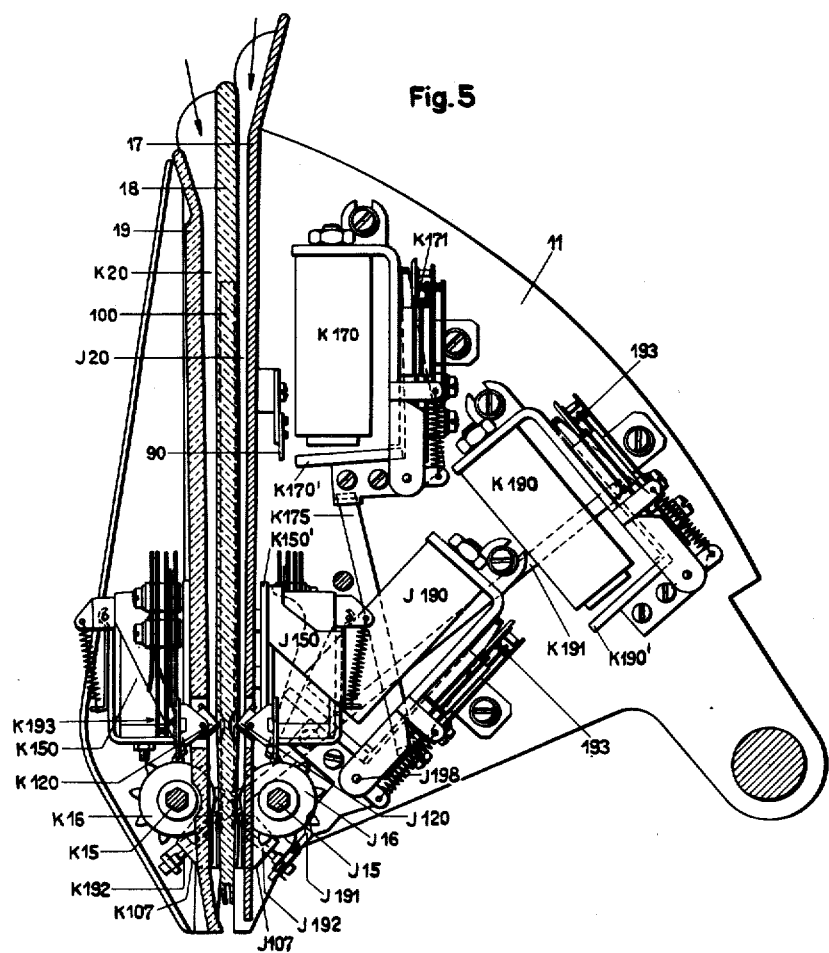

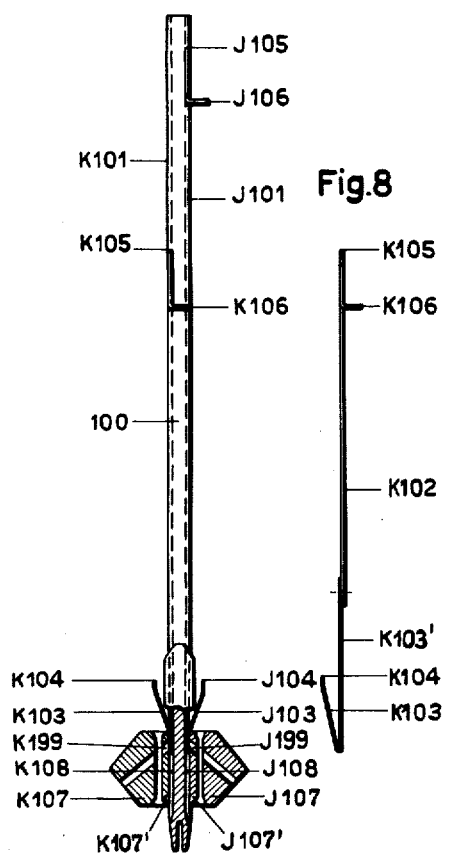
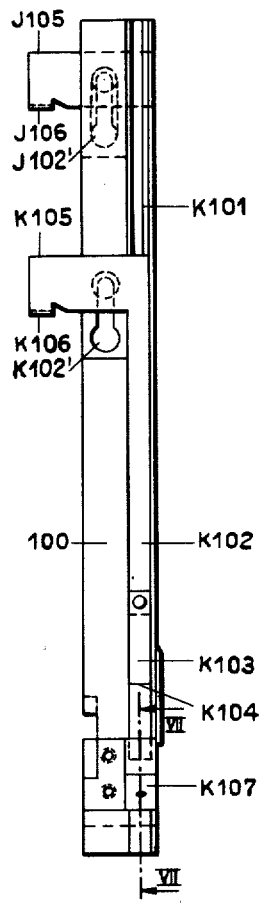

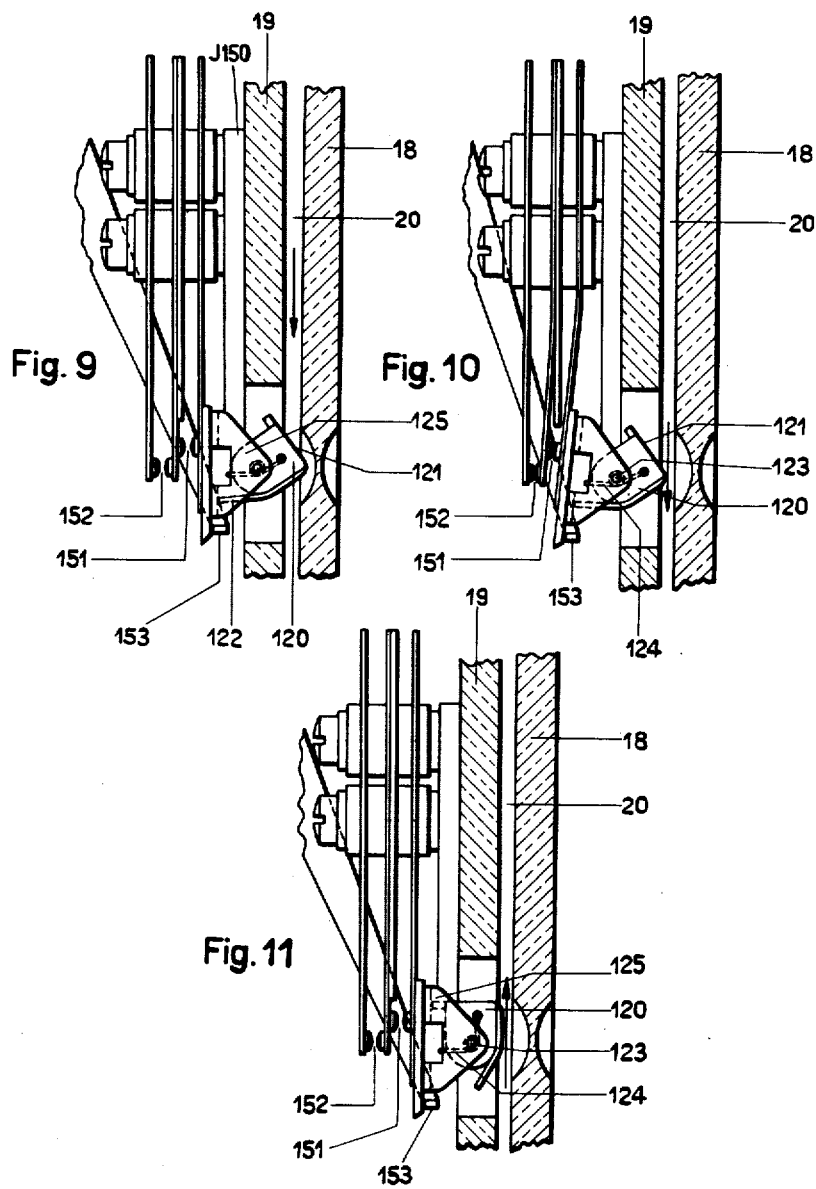

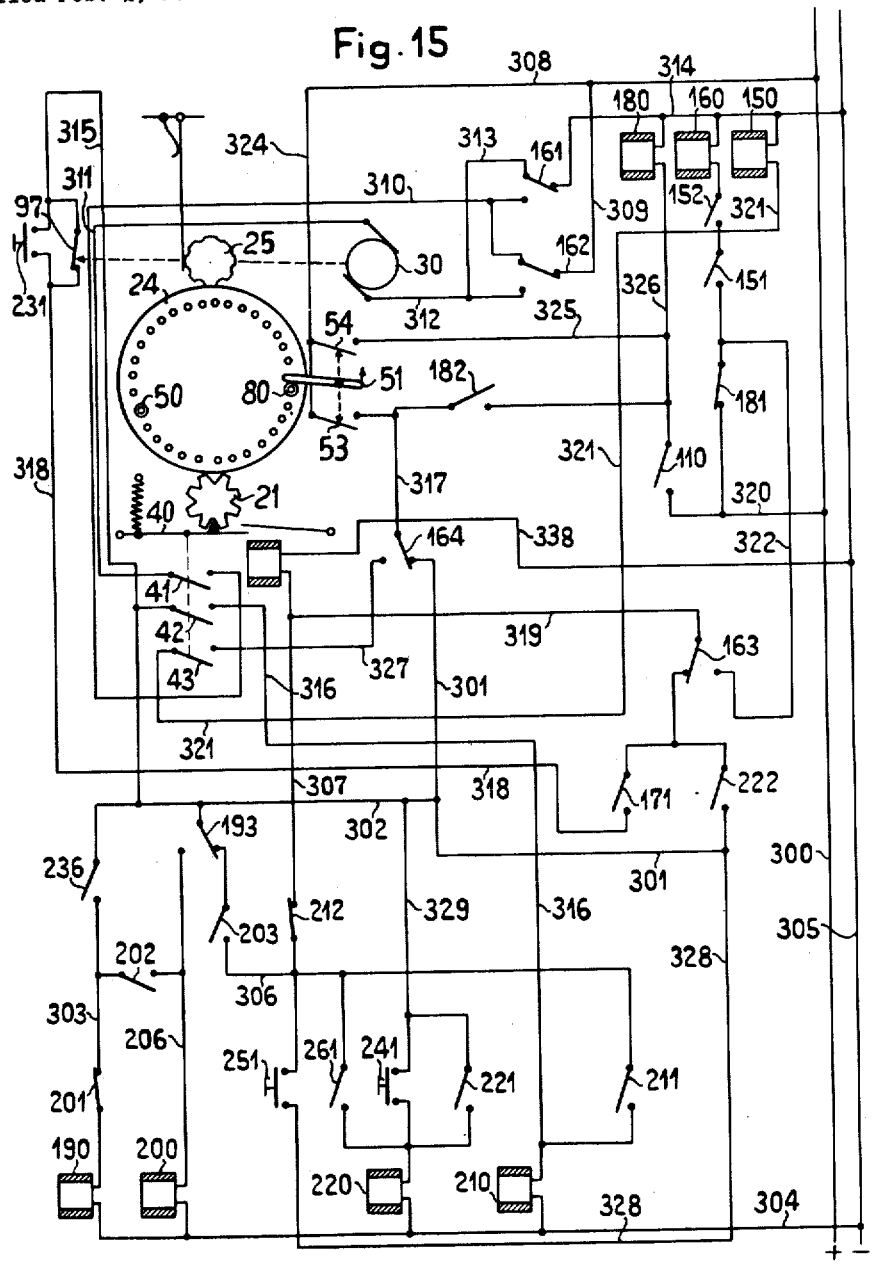

1

2,831,560

FRONT FEED APPARATUS FOR BOOKKEEPING OR TYPEWRITING MACHINES

Max Oberholzer, Bern, Liebefeld, and Walter Reber, Bern, Bumpliz, Switzerland, assignors to Ruf-Buchhaltung Aktiengesellschaft, Zurich, Switzerland Application February 2, 1955, Serial No. 485,782

Claims priority, application Switzerland February 6, 1954

18 Claims. (Cl. 197—128)

The present invention relates to a front feed apparatus for bookkeeping or typewriting machines and, more particularly, to an apparatus of this kind which is adapted to be mounted on the carriage of a bookkeeping or typewriting machine and to accommodate one or more sheets in writing position.

It is an object of the present invention to provide the front feed apparatus with a motor-driven paper feed and line spacing mechanism which is automatically put in operation upon the introduction of a sheet to feed the same into writing position and to arrest it there.

It is another object of the invention to enable the operator by a simple manipulation, such as the operation of a press button, to cause the automatic ejection of the sheet. Other objects are to provide improved means which will automatically line-space the sheet introduced into the apparatus coincidentally to a return of the carriage of the bookkeeping or typewriting machine. Further objects are to provide improved means for automatically marking the sheet with respect to the last line typed thereon, such marks serving to control the paper feed upon reintroduction of the sheet.

Other objects of the present invention will appear from the detailed description of a preferred embodiment thereof described hereinafter and the features of novelty will be pointed out in the claims. It is to be understood, however, that such detailed description serves the purpose of illustrating the invention rather than that of restricting or limiting the same. In the accompanying drawings, Fig. 1 is a front view of the novel front feed apparatus adapted to be mounted on the carriage of a typewriting or bookkeeping machine, Fig. 2 is a rear view of the same apparatus, Fig. 3 is a side view drawn on an enlarged scale as viewed from the left with reference to Fig. 1 upon removal of the cover plate;

Fig. 4 is a view similar to that of Fig. 3 viewed from the right with respect to Fig. 1 upon removal of the cover plate;

Fig. 5 is a vertical transverse section substantially taken along the line V—V of Fig. 1;

Fig. 6 illustrates a control slide and the support thereof;

Fig. 7 is a side view partly in section as viewed from the right with reference to Fig. 6, the section being taken along the line VII—VII of Fig. 6;

Fig. 8 is a view of the control slide shown in Fig. 7, but isolated from its support;

Fig. 9 is an isolated view on an enlarged scale of a mechanism shown in Fig. 5;

Figs. 10 and 11 are similar views of the mechanism shown in Fig. 9, the elements of this mechanism assuming different positions;

Fig. 15 is an electrical circuit diagram in which some

Figure 1:
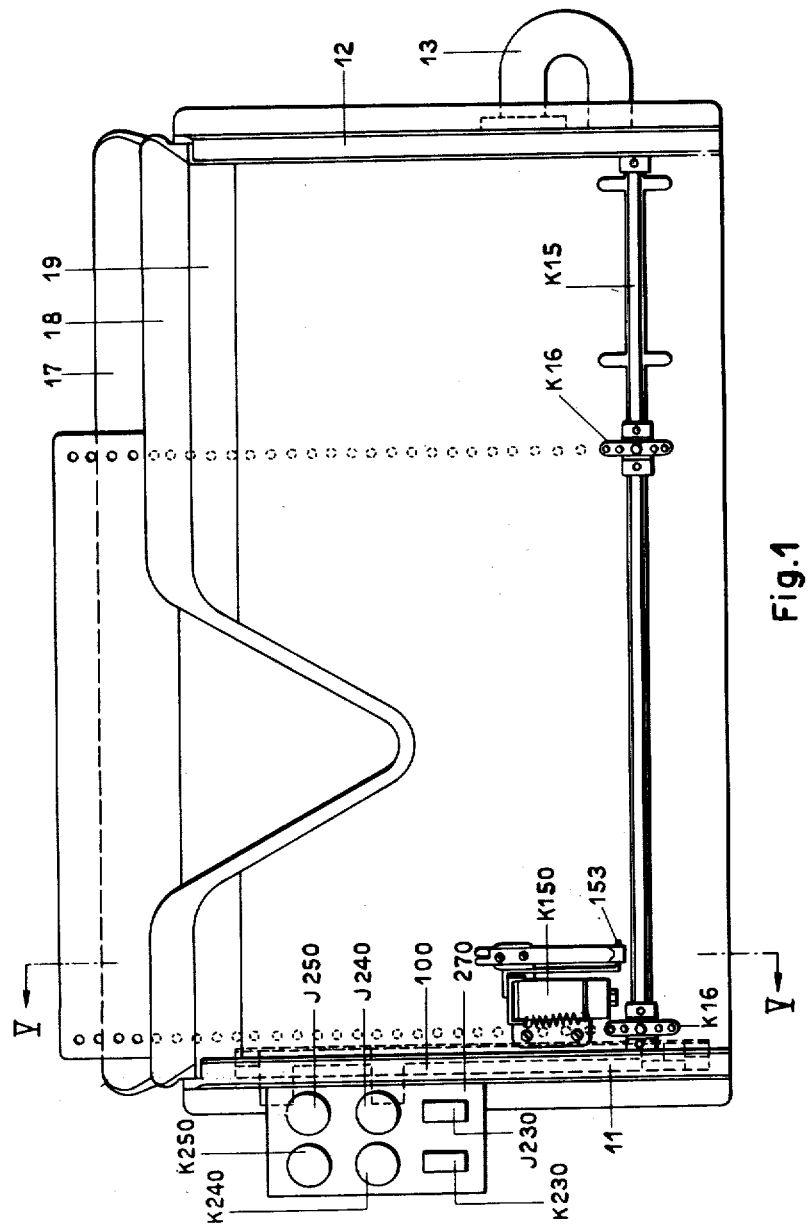

2 of the mechanical elements of the apparatus are likewise diagrammatically indicated.

The improved front feed apparatus for bookkeeping and typewriting machines comprises a frame confining a pair of guide slots open at the top and at the bottom indicated by the arrows in Fig. 5, one guide slot being adapted to receive a ledger sheet and the other guide slot being adapted to receive an account sheet. A duplicate set of power-driven paper feeding and line spacing mechanisms is provided, one set for each guide slot. The elements of these paper feeding and line spacing mechanisms are carried by the frame and, more particularly, by the end walls 11 and 12 thereof, being mounted on either side of the frame and carried by a U-shaped frame bar 13 which connects the end walls 11 and 12. One limb of the U-shaped frame bar is adapted to be mounted in suitable sockets provided on the carriage of the typewriting or bookkeeping machine in such a manner that the sheets or sheets issuing from the slot or slots J20, or K20 respectively, at the lower end thereof will enter the channel confined by the front of the platen and the paper guides of the typewriting machine.

In Figs. 1 to 7 the elements of the paper feeding and line spacing mechanism coordinated to the rear slot J20 provided for the account sheet are designated by numerals provided with the prefix J, whereas the elements of the other set of the paper feeding and line spacing mechanism allotted to the front slot K20 for the ledger sheet are designated by numerals provided with the prefix K. Unless stated otherwise, the description following hereinafter applies equally to the one set as to the other set of the paper feeding and line spacing mechanism. In Figs. 8 to 15 which apply to both sets of mechanisms each element is designated by the same numeral as in the other figures.

Two parallel horizontal shafts J15 and K 15 are journalled in suitable bearings fixed to the end walls 11 and 12 near the bottom thereof at substantially the same level so as to extend from one side wall to the other. The two slots K20 and J20 are formed by a vertical rear wall 17 extending parallel to the shafts K15 and J15 therebetween and fixed to the side walls and by two plates 18 and 19 likewise fixed thereto in spaced parallel relationship to each other and to wall 17. Preferably, the plates 18 and 19 are made of a transparent plastic. A pair of toothed paper feeding wheels is fixed to each of the shafts J15 and K15, such wheels extending through slots of the wall 17, or the plate 19 respectively, into the associated slot J20, and K20 respectively, as will appear from Fig. 5. In this manner, each of the wheels is adapted to engage a perforation provided adjacent to the side edge of the respective sheet. Each of the shafts J15 and K15 is provided at one of its ends with a notched wheel J21, and K21 respectively, the notches of such wheel being circumferentially spaced in accordance with the line spacing of the sheets to be typed. Moreover, a pinion J23, or K23, respectively, is secured to the shaft J15, or K15, respectively, adjacent to the notched wheel and meshes with a control gear J24, or K24, respectively, which is journalled on a stud J92, or K92, respectively, attached to and projecting from the outside of the adjacent end wall 12, or 11, respectively.

The control gear which is thus geared to the feed wheels J16, or K16, respectively, is provided with a plurality of angularly distributed sockets J31, or K31, respectively. A control pin J50, or K50, respectively, may be optionally inserted into any one of the sockets. Moreover, the control gear is provided with a stud J80, or K80, respectively, serving to control a locking mechanism which will be described later. Finally, the control gear J24, or K24, respectively, carries a switch-actuating stud J260, or K260, respectively, adapted in a predetermined angular position of the control gear to close a switch J261, or K261, respectively, mounted on the side wall 12, or 11, respectively.

Figure 2:
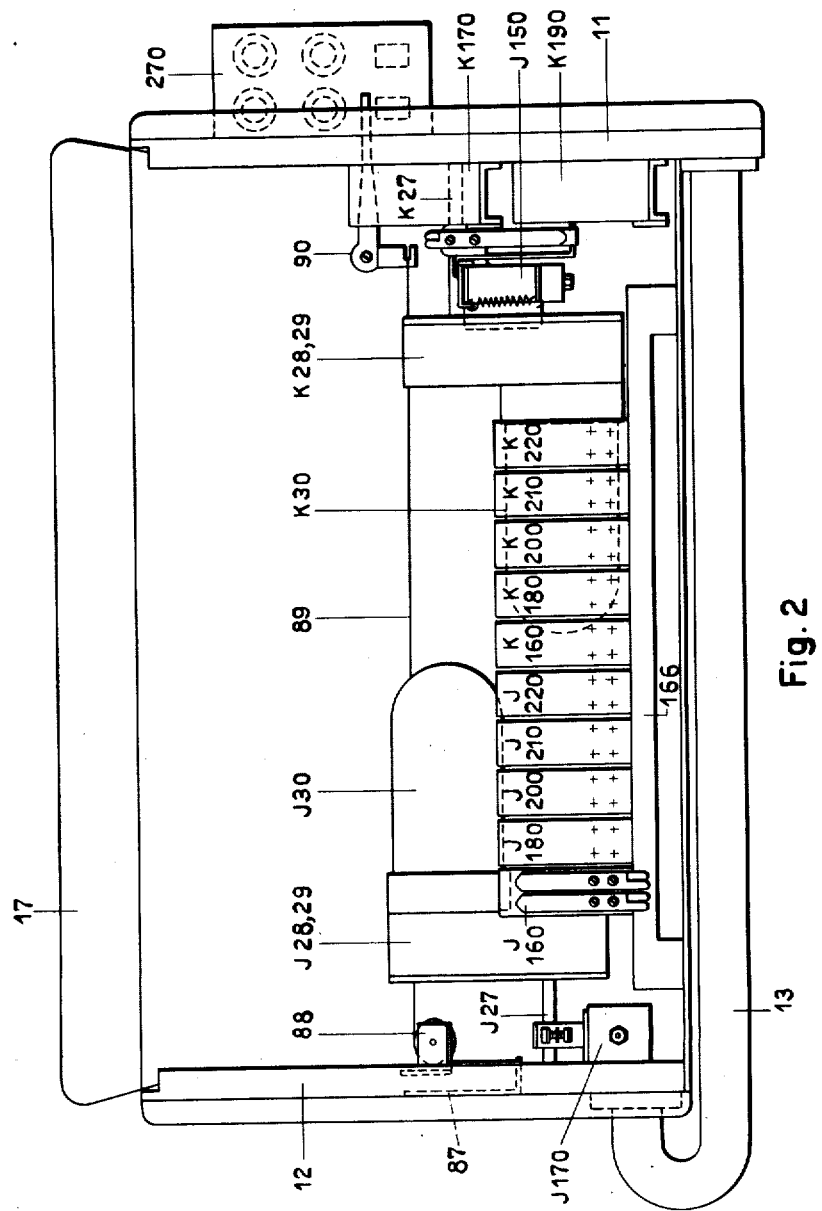

A shaft J27 and a shaft K27 extend parallel to the shafts J15 and K15 and are rotatably mounted in the frame, each shaft being provided with a pinion J26, or K26 respectively, mounted in permanent mesh with the associated control gear J24, or K24 respectively, and may be driven by an electric motor to thereby impart rotation to the control gear and to the associated paper feeding shaft J15, or K15 respectively. The electric motor J30, or K30 respectively, which is shown in Fig. 2, is geared to the associated shaft J27, or K27 respectively, by a suitable speed-reducing transmission J29, or K29 respectively. The casing of this transmission contains a disengageable clutch J28, or K28 respectively.

The angular distances of the sockets J31, or K31 respectively, and of the notches of the wheel J21, or K21 respectively, are so chosen as to correspond to the line spacing of the sheet to be typed upon. Therefore, when the record sheet is line-spaced by the feed wheels J16, or K16 respectively, under control by the line spacing mechanism to be described later, the respective notched wheel J21, or K21 respectively, will be turned through the angular distance of adjacent notches, and the control gear J24, or K24 respectively, will be turned through the angular distance of two adjacent sockets J31, or K31 respectively.

The line spacing mechanism includes the notched wheel just described and a cam wheel J25, or K25 respectively, which is secured to the shaft J27, or K27 respectively, and is formed with a plurality of peripherally distributed cam lobes and intermediate recesses, the ratio of transmission and the number of lobes being so chosen that the cam wheel will be turned through the angular distance of adjacent lobes in a line spacing operation. Therefore, when the sheet has been fed through one line space the wheel J21, or K21 respectively, has been turned one notch, the control gear J24, or K24 respectively, has been turned one pitch determined by the sockets J31, or K31 respectively, and the cam wheel J25, or K25 respectively, has ben turned one cam lobe.

A two armed detent lever J40, or K40 respectively, is fulcrumed on a pin J45, or K45 respectively, fixed to the frame end plate 12, or 11 respectively, and has a tooth J46, or K46 respectively, which is normally drawn into engagement with the associated notched wheel by a helical spring J44, or K44 respectively, which has one end anchored to the end plate 12, or 11 respectively, and the other end to the lever J40, or a third arm of K40 respectively. By the cooperation of the notched wheel with the spring-controlled detent lever, the shaft J15, or K15 respectively, will be so arrested as to accurately position the sheet with respect to the type levers.

Means are provided for disengaging the detent lever J40, or K40 respectively, from the notched wheel and to simultaneously start the electric motor J30, or K30 respectively. In the embodiment shown, such means comprises an actuator in form of an electromagnet J170 (Figs. 2 and 5) of frame end plate 12 and an electromagnet K170 (Fig. 2) mounted on the inside of frame end plate 11. A swingably mounted armature coordinated to the electromagnet is provided with an arm J175 (Fig. 4), or K175 (Fig. 3) respectively, which has a bent end engaging the associated detent lever J40, or K40 respectively. In the drawings, armature K170' only is shown in Fig. 5. When the armature is attracted its arm J175, or K175 respectively, will rock the detent lever so as to disengage the same from the notched wheel J21, or K21 respectively.

Three electrical switches J41, J42, J43, or K41, K42, K43 respectively, which are composed of pairs of leaf springs carrying electrical contacts are mounted on a bracket J93 (Fig. 4), or K93 respectively, which is secured to the frame end plate 12, or 11 respectively. These switches are normally open and are so interconnected by suitable pins fixed to some of the leaf springs and are so disposed as to be adapted for common actuation by the lever J40, or K40 respectively, as will appear from Figs. 3 and 4. Therefore, the switches J41, J42 and J43, or K41, K42 and K43 respectively, will be closed coincidentally to the disengagement of the detent lever from the associated notched wheel. The bracket J93 is mounted on the outside of frame end plate 12 and the bracket K93 is mounted on the outside of frame end plate 11, whereas the electromagnets J170 and K170 are mounted on the inside of the respective end plates, the bent ends of the arms J175 and K175 extending through suitable apertures of the end plates 12 and 11 into engagement with the detent levers J40, and K40 respectively. The gears J23, J24 and J26, or K23, K24 and K26 respectively, the detent wheels J21, or K21 respectively, and the cam wheels J25, or K25 respectively, are mounted on the outside of the associated frame end plate 12, or 11 respectively.

As will be later described, the actuation of the switches J41, or K41 respectively, starts the motor J30, or K30 respectively, which thereupon will drive the shaft J27, or K27 respectively, the gears J26, J24 and J23, and the gears K26, K24 and K23 respectively, the cam wheels J25, and K25 respectively, and the paper feed wheels J16, and K16 respectively.

Figure 3:
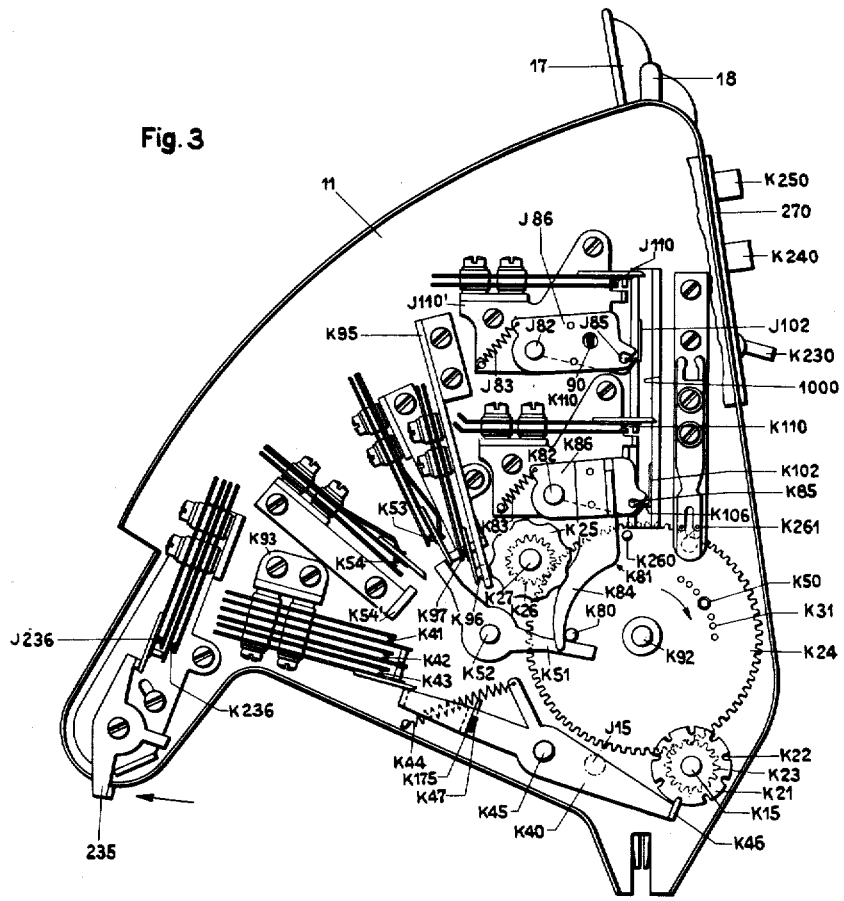

As will appear from Fig. 3, a bracket J95 mounted on the outside of frame end plate 12 and a bracket K95 mounted on the outside of frame end plate 11 are each provided with an opening in which a ball J96, or K96 respectively, is guided in engagement with the cam wheel J25, or K25 respectively, and in engagement with one leaf spring of a pair of contact-carrying leaf springs J97, or K97 respectively, which is mounted on the associated bracket J95, or K95 respectively, the arrangement being so provided that when the ball J96, or K96 respectively, engages a lobe of the cam wheel it will keep the switch J97, or K97 respectively, in closed condition. When the respective sheet, upon disengagement of the detent lever J40, or K40 respectively, from the associated detent wheel, has been fed one line space, the ball 96, or K96 respectively, will enter a recess between adjacent lobes of the cam wheel J25, or K25 respectively, and will thus permit the switch J97, or K97 respectively, to open. As will be described later with reference to the circuit diagram shown in Fig. 15, the switch J97, or K97 respectively, may be so connected with other circuit-controlling elements that the electric motor will be stopped and the electromagnet J170, or K170 respectively, will be deenergized thereby permitting the spring J44, or K44 respectively, to re-engage the detent lever with the next notch of the notched wheel J21, or K21 respectively, to accurately adjust the sheet in the next line position.

Prior to the introduction of a record sheet into the slot J20, or K20 respectively, the associated control gear J24, or K24 respectively, is in the position shown in Fig. 4, or 3 respectively. A movable sensing element J120, or K120 respectively (Figs. 5, 9, 10 and 11), which later will be described in detail, projects into the slot. Upon engagement by the record sheet it will actuate a switch and will thereby start the electric motor J30, or K30 respectively, which drives the control gear in the direction indicated by an arrow in Figs. 3, 4 and 15 starting from the position shown therein. If the record sheet is a new sheet free from entries, and when it will have been fed a distance determined by the selection of the socket J31, or K31 respectively, into which the pin J50, or K50 respectively, has been inserted, such pin will engage one arm of a two-armed lever J51, or K51 respectively, fulcrumed upon a pin J52, or K52 respectively, projecting outwardly from the frame end plate 12, or 11 respectively, the other arm of such lever being movable between two end positions. In one end position it engages a leaf spring of a switch J53, or K53 respectively, thereby opening such switch, and in the other end position it engages a leaf spring of a switch J54, or K54 respectively, thereby closing such switch. The switch J53, or K53 respectively, which is normally closed and the switch J54, or K54 respectively, which is normally open, are carried by brackets mounted on the outside of the associated frame end plate. The brackets are provided with stops, such as K54′, which determine the end positions of lever J51, or K51 respectively.

After a record sheet introduced into the slot J20, or K20 respectively, has been fed downwardly by the power-driven feeding wheels until the same are stopped as a result of the engagement of pin J50, or K50 respectively, with the lever J51, or K51 respectively, resulting in the closing of the switch J54, or K54 respectively, the typing operation commences and the sheet is line-spaced in upward direction. As will be described later, the power-driven feeding mechanism is reversed for that purpose and intermittently put in operation to lift the record sheet line by line. After the last line has been typed, a punch to be described later will be operated to mark the position of the last line typed upon the sheet.

When a record sheet provided with such a mark is introduced it will engage the movable sensing element and start the sheet-feeding device in introducing direction in the same manner as described above. However, this feeding motion will be interrupted before the pin J50, or K50 respectively, will engage lever J51, or K51 respectively, because a mechanism now to be described is provided which will stop the electric feeding motor when the last entry on the sheet will approach the typing point and when the new line to be typed arrives thereat.

For this purpose, the apparatus is provided with a detector which projects into the slot J20, or K20 respectively, and yieldingly slides on the record sheet in order to detect the mark therein designating the position of the last entry. The detector is constituted by a leaf spring J103, J104, or K103, K104 respectively, which extends upwardly in an inclined position from the lower end of a leaf spring section J103′, or K103′ respectively, fixed to a strip J102, or K102 respectively, of sheet metal. This strip which at its top has a lateral projection J105, or K105 respectively, provided with a horizontally bent lip J106, or K106 respectively, is slidably guided for vertical displacement on a supporting plate 100. As will appear from Figs. 6 and 7, the supporting plate 100 is inserted in an elongate aperture provided in the wall 18 intermediate the two slots J20 and K20 and on its rear face carries the strip J102 and on its front face carries the strip K102. For the purpose of guiding the strips, the supporting plate 100 is provided with longitudinal grooves J101 and K101 and with key slots J102′ and K102′ in which headed pins secured to the projections J105, or K105 respectively, are guided.

From the foregoing description it will appear that when the slides formed by the strips J102 and K102 are in the position shown in Fig. 7, the detectors J103, or K103 respectively, project into the coordinated slot and are adapted to slidably engage the record sheet being fed downwardly by the motor-driven feeding wheels. If the record sheet is provided with a punched hole indicating the last line of its entries, such hole will engage over the detector and carry the same along downwardly together with the supporting slide J102, or K102 respectively, until the slide will actuate a switch J110, or K110 respectively, to thereby stop the feed.

In order to prevent the leading edge of the record sheet being fed from engaging the detector, the frame of the apparatus is provided with a deflector mounted for co-operation with the detector leaf spring when the slide is in its lower end position and to deflect the leaf spring into inactive position out of engagement with the sheet so that the leading edge of the sheet may pass the detector without actuating the slide. The deflector is formed by a plate J107′, or K107′ respectively, which is mounted on the plate 18 extending across the opening which accommodates the support 100 being slightly spaced therefrom so as to confine a slot J108, or K108 respectively, therewith. When the slide J102, or K102 respectively, is in its lowermost position, the detector leaf spring enters the slot and is thereby deflected into contact with the leaf spring section J103, or K103 respectively. Hence, the record sheet may freely pass over the plate J107′, or K107′ respectively.

The punching mechanism above referred to comprises a punching pin J192, or K192 respectively, which is slidably guided in an inclined bore of a block J107, or K107 respectively, secured to the wall 17 or to the plate 19 near the bottom thereof as will appear from Fig. 5. The punching pin may enter holes J199, or K199 respectively, provided in the plate J107′, or K107′ respectively, in alignment with the bores. When the last line of the record sheet has been typed, the respective punching mechanism is actuated to mark the record sheet positioned between the block J107, or K107 respectively, and the plate J107′, or K107′ respectively, with a suitable hole. Preferably, the punching pin is provided with a semi-circular cutting edge which will punch out a scale-like portion from the record sheet, which portion remains coherent at its basis with the sheet. This has the advantage that such scale-like portion may be readily caught by the detector leaf spring when the sheet slides over the detector. The block J107, or K107 respectively, may be connected with the plate J107′, or K107′ respectively, by a transverse connecting member which serves to guide the vertical edge of the record sheet.

The punching pin J192 is adapted to be actuated by an arm J191 of an armature fulcrumed on a pin J198 carried by a bracket fixed to the inside of end plate 11. The bracket carries an electromagnet J190 adapted to attract the armature. The punching pin K192 is adapted to be actuated by a connecting rod K191 linked to an arm of an armature K190′ associated with an electromagnet K190. This electromagnet and its armature are carried by a bracket likewise secured to the inside of end plate 11. Moreover, both brackets carry electrical contacts for actuation by the armatures of magnets J190 and K190.

Each of the switches J110 and K110 which is normally open consists of a pair of leaf springs carried by a bracket J110′, or K110′ respectively, mounted on the outside of frame end plate 11, the bracket J110′ being located above the bracket K110′. The frame end plate 11 is provided with a vertical slot 1000 through which the lateral projections J105 and K105 of the detector slides extend. In its uppermost position the upper edge of the projection engages the respective upper leaf spring 111 of the switch J110, or K110 respectively, from below and keeps it lifted above its normal position, as will appear from Fig. 13. In this condition, the switch is open. When the detector slide is lowered from its topmost position, however, the switch J110, or K110 respectively, will be closed as shown in Fig. 14 provided, however, that theretofore its lower leaf spring has been conditioned for closure of the switch by upward rocking movement of an arm J86, or K86 respectively, lifting the lower leaf spring 112 of the switch.

The arm J86, or K86 respectively, is fulcrumed on a pin J82, or K82 respectively, laterally projecting from the bracket J111′, or K111′ respectively, beneath the associated switch. A helical spring J83, or K83 respectively, is extended between an upper rearward projection of arm J86, or K86 respectively, and a pin projecting from the bracket and tends to rock the arm upwardly into the switch-closing position. The free end of the arm is provided with a slot J85, or K85 respectively, adapted to engage over the lip J106 or K106 of the respective detector slide. A locking mechanism is provided which is controlled by the control gear J24, or K24 respectively, and normally locks the arm J86, or K86 respectively, in its lower position. The locking mechanism of arm J86 is constructed as follows:

A bell crank 90 (Fig. 2) which is fulcrumed on a suitable bracket (not shown) fixed to the inside of frame end plate 11 has a horizontal arm extending through a suitable aperture of plate 11 into a hole of arm J86, as shown in Fig. 3, and has a depending arm connected by a cord 89 running over a sheave to the rear arm of a double-armed lever 87 (Fig. 4) to which it is attached, the sheave being journalled in a bracket 88 secured to the inside of end wall 12, as shown in Fig. 2. The end of arm 87 is bent so as to extend through a suitable slot of bracket J93 and through a registering aperture of the end plate 12, as will appear from Fig. 2.

The front arm J84 of lever 87 has the shape of an arc concentric to the pin J92. When the control gear J24 is in its normal position prior to the introduction of a record sheet, the pin J80 thereof locks the arm J84 from anti-clockwise rocking movement with respect to Fig. 4, and the cord 89 keeps bell crank 90 in the position shown in Fig. 2 in which it keeps arm J86 locked in its lowermost position shown in Fig. 3.

The locking mechanism associated with arm K86 comprises a sheet metal member K84 riveted to the arm K86 and extending downwardly therefrom and terminating in a tail K84 having an arc-shaped edge concentric to pin K92. When the control gear K24 is in its normal position prior to the introduction of a record sheet, as shown in Fig. 3, the pin K80 engages the end of the tail K84.

When a record sheet has been introduced into the respective slot and is being fed downwardly by the power-driven feeding wheels, the control gear J24, or K24 respectively, turns in the direction indicated by the arrows, the pin J80, or K80 respectively, moving along the arc-shaped edge of the locking member J84, or K84 respectively. When the leading edge of the record sheet has passed the end J104, or K104 respectively, of the detector, the pin J80, or K80 respectively, releases the locking member and permits the spring J83, or K83 respectively, to swing the arm J86, or K86 respectively, upwardly into the position shown in Fig. 13 in which the slot J85, or K85 respectively, will be disengaged from the lip J106, or K106 respectively, permitting the detector slide upon engagement with the marking hole in the record sheet to be carried along downwardly by the same and releasing leaf spring 111, whereby said switch J110, or K110 respectively, will be closed. This cooperation of the detecting slide J102, or K102 respectively, with the switch J110, or K110 respectively, is illustrated in Figs. 12, 13 and 14.

Figure 12:
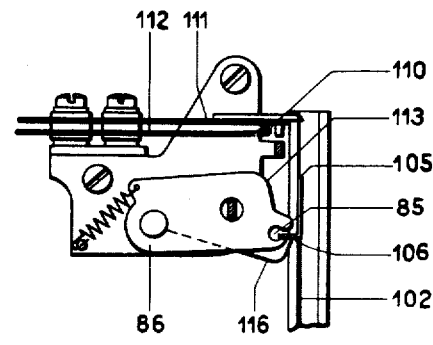
Fig. 12 is a detailed view of a mechanism shown in Fig. 3.

Fig. 12 shows the detector slide in its lowermost position in which its lip J106, or K106 respectively, is engaged in the slot J85, or K85 respectively. The switch J110, or K110 respectively, is open.

Figure 13:
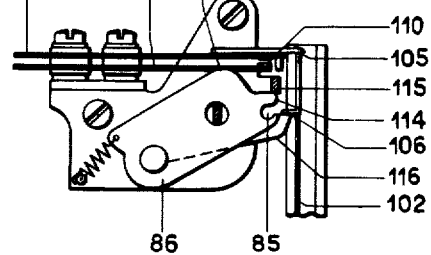
Figs. 13 and 14 illustrate the mechanism shown in Fig. 12 with the elements thereof in various positions of operation.
Figure 14:
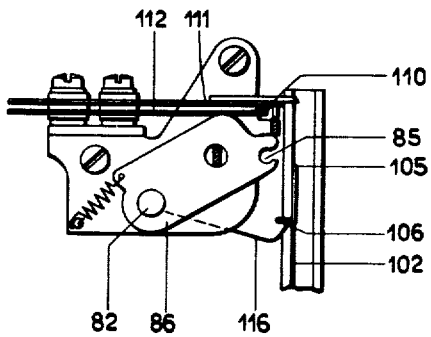

In Fig. 13 the detector slide J102, or K102 respectively, is illustrated in its top most position and the arm J86, or K86 respectively, is likewise in its topmost position in which a shoulder 114 provided at its free end abuts against a fixed stop 115 provided on bracket J110', or K110' respectively. The lower contact spring 112 is lifted by engagement with the arm J86, or K86 respectively, at the point 113. The lip J106, or K106 respectively, is disengaged from the slot J85, or K85 respectively. A leaf spring 116 has one end fixed to the pin J82, or K82 respectively, and its other end engages the bottom face of lip J106, or K106 respectively, urging the same in upward direction. Therefore, the detector slide keeps the leaf spring 111 in lifted condition in which the switch is still open as shown in Fig. 13.

In Fig. 14 the parts are shown in the position in which the detector slide has detected a mark in the respective record sheet and is carried downwardly by the latter so that it will release the upper leaf spring 112 permitting same to close the switch J110, or K110 respectively. As will be described later, this has the effect of stopping the motor even before the pin J50, or K50 respectively, engages the lever J51, or K51 respectively.

The movable sensing element J120, or K120 respectively, will now be described in detail. Each sensing element comprises a support 125 (Figs. 9, 10 and 11) which is movable transversely to the associated slot J20, or K20 respectively, whereby the sensing element may be shifted from its normal position in which it projects through the slot, as shown in Fig. 9, into a retracted position, as shown in Fig. 10, in which the sensing element substantially clears the slot to permit passage of the record sheet. In the embodiment shown the support is carried by a leaf spring fixed to a bracket J150', or K150' respectively. The bracket J150' is mounted on the front face of plate 19 near the bottom thereof, whereas the bracket K150' is mounted on the back of the wall 17 near the bottom thereof in substantial registry with the bracket J150'.

The sensing element J120, or K120 respectively, is formed by a block projecting into the space between two vertical parallel flanges of the support 125 and is provided with trunnions 123 journalled in suitable bores of such flanges so that the block is pivotally mounted for swinging movement from the position shown in Figs. 9 and 10 to the retracted position shown in Fig. 11. The block is provided with a stop member 122 which normally engages the support under the effect of a helical spring which surrounds one of the trunnions 123 and has one end fixed to the support and the other end fixed to the block tending to turn the same clockwise with respect to Figs. 9, 10 and 11. When the block is in normal position, its front face 121 is inclined, as will appear from Figs. 5, 9 and 10. When the block is in the normal resting position, as shown in Fig. 9, it projects into a shallow recess provided in the plate 18 on each side thereof.

When a record sheet is introduced into the slot J20, or K20 respectively, and engages the inclined face 121, it will laterally displace the movable sensing member into the position shown in Fig. 10 in which a contact mounted on the support-carrying leaf spring engages the coordinated contact of a switch J151, or K151 respectively. As will be explained later, a circuit is thus closed whereby an actuator, preferably formed by an electromagnet J150, or K150 respectively, is energized. The armature associated with the electro-magnet is provided with an arm J153, or K153 respectively, which engages the leaf spring carrying the movable sensing element and, upon attraction of the armature, withdraws the sensing element from the slot J20, or K20 respectively, as shown in Fig. 10. As a result, the record sheet may be fed in the direction of the arrow in Figs. 9 and 10 without interference by the sensing element.

As stated heretofore, the intermittent line spacing movement of the sheet is performed in upward direction contrary to the arrows. In this operation the electromagnet J150, or K150 respectively, may be de-energized and may thus permit the support 125 to return to the position shown in Fig. 11. When that happens, the block constituting the sensing element J120, or K120 respectively, may be tilted by frictional engagement with the record sheet into the position shown in Fig. 11 in which it does not interfere with the line spacing movement of the sheet.

From the foregoing description it will be understood that the switch J151, or K151 respectively, constitutes an electrical control member which is adapted to render the actuator J150, or K150 respectively, effective to withdraw the sensing element. Preferably, the actuator J150, or K150 respectively, when becoming effective closes a second switch J152, or K152 respectively, which is normally open, as will appear from Figs. 9 and 10.

In the embodiment shown, the movable sensing element J120, or K120 respectively, projects into the associated slot J20, or K20 respectively, at a point located above and closely spaced from the associated paper feeding wheel J16, or K16 respectively. This has the advantage that the sensing element acts as a buffer for the sheet to check the impact caused by engagement of the latter with the feed wheels when the sheet is dropped into the slot. In this manner, the sheet is prevented from rebounding from the wheels, but will be properly engaged by the same and fed in downward direction.

A number of relays is provided, such as J160, J180, J200, J210 and J220, and K160, K180, K200, K210 and K220 mounted on a common shelf 166 secured to the supporting frame above the longer limb of the U-shaped frame bar 13 (Fig. 2). A switch board 217 secured to and laterally projecting from the end plate 100 carries press button switches J230, J240, J250 and K230, K240, K250, as will appear from Fig. 1. Finally, there is provided a press button switch 251 (Fig. 15) which is automatically closed during the return movement of the typewriter carriage, and a pair of switches J236 and K236 which are normally open, but will be closed by a lever 235 upon the return movement of the typewriter carriage. As will appear from Fig. 3, the lever 235 is pivotally mounted on a rear lower projection of end plate 11. While the upper arm of this lever is adapted to actuate the switches J236 and K236, its lower end projects downwardly into a position in which it may engage a stationary cam during the carriage return movement.

The manner in which the various electrical elements, such as the electric motors, the switches, the electromagnets and the relays are connected will appear from the following explanation of the operation of the improved front feed apparatus with reference to the circuit diagram shown in Fig. 15 in which the numerals from 300 to 330 designate electrical conductors or leads. The various switches are illustrated in their normal, non-actuated conditions except for switch 53 shown as being held open by lever 51, as this is the initial starting condition of the apparatus.

*Introduction of a blank record sheet*

If a blank record sheet free from a marking hole is introduced into the respective slot J20 or K20, it will engage the sensing element J120, or K120 respectively, which will close its switch 151 whereby a circuit will be closed extending from the line 103 connected to the positive terminal of a source of current through line 320, normally closed switch 181, switch 151 closed by the sensing element, line 321, and winding of electromagnet 150 to line 305 connected to the negative terminal of the source of current. In this circuit, electromagnet 150 will be energized to withdraw the sensing element as described and to close its relay switch 152, whereby a circuit is closed extending from line 300 through line 320, switch 181, switch 151, switch 152, relay winding 160, and line 314 to line 305. In this circuit, the relay magnet 160 is energized and will shift the switches 161, 163, 162 and 164 into positions opposite to those shown in Fig. 15.

At this point it must be stated that in the circuit diagram shown in Fig. 15 the relay switches are not always shown as being located adjacent to the associated relay coil and to each other, although in practice they are so located for common actuation by an armature in a manner well known in the art.

The switch 163 now closes a circuit extending from positive line 300 through line 320, normally closed relay switch 181, line 322, relay switch 163 just referred to, line 319, relay coil of magnet 170, and line 338 to the negative line 305. In this circuit, the electromagnet 170 is energized and will actuate the detent lever J40, or K40 respectively, and will close the associated switches J171, or K171 respectively, J41, J42, J43, or K41, K42, K43 respectively. The contact J41, or K41 respectively, will close the following circuit: Positive line 300, lines 308 and 309, relay switch 162 of relay 160, line 312, motor 30, line 311, contact 41, line 310, relay switch 161 of relay 160, line 314, negative line 305. Therefore, the motor will run in forward direction. The energization of the relays 160 and 170 takes so much time that the sheet or sheets, after having actuated the sensing elements J120, or K120 respectively, will drop into engagement with the respective feeding wheel J16 or K16 before the motor will be started in forward direction feeding the sheet downwardly out of the bottom end of the slot J20, or K20 respectively, and into typing position in the bookkeeping or typewriting machine. Coincidentally with the commencement of the feeding motion, the control gear J24, or K24 respectively, will be rotated in clockwise direction from the position shown in Fig. 15 and will disengage lever 51 and permit switch 53 to close.

As the blank sheet is free from any punched line mark it will not actuate the detector, and the switch J110, or K110 respectively, will remain open. The feeding movement will continue until the pin J50, or K50 respectively, running in the direction of the arrow in Fig. 15 will engage the switch lever 51 rocking same anti-clockwise and causing same to close the normally open contact 54 thereby establishing a circuit leading from the positive line 300 through lines 308 and 324, contact 54 just closed, lins 325, 326, relay coil 180, and line 314 to negative line 305. The relay 180 opens its normally closed switch 181 and closes its normally open switch 182. While the opening of switch 181 interrupts the above described circuits in which the relays 150, 160 and 170 are included causing relay magnet 170 to be de-energized, there exists a holding circuit for relay 160 extending from the positive line 300 through lines 308 and 324, contact 53, line 317, operated switch 164, line 327, switch 43 still closed, line 321, switch 152, relay coil 160, and line 314 to the negative line 305.

Although magnet 170 is de-energized the three switches 41, 42 and 43 will be kept closed by the lever J40, or K40 respectively, because this lever, although now released by arm J175, or K175 respectively, cannot return to the position shown in Figs. 3 and 4 since its tooth J46, or K46 respectively, is out of registry with the notches J22, or K22 respectively, at the instant in which the lever 51 closes the switch 54 and, therefore, is held by the notched wheel J21, or K21 respectively, in the rocked condition in which it holds the three switches J41, J42, J43, or K41, K42, K43 respectively, in closed condition.

A branch of the holding circuit just described extends through relay coil 150. Therefore, the energization of relays 150 and 160 continues. It will be noted from Figs. 3 and 4 that the levers J51 and K51, after having engaged and closed the switches J54 and K54, are still somewhat spaced from the stop J54', and K54' respectively, and are, therefore, free to continue their anticlockwise rocking movement while the feeding motion and the coincidental rotation of control gear J24, or K24 respectively, continues through a short distance until the next notch of the notched wheel J21, or K21 respectively, arrives in position to permit the tooth J46, or K46 respectively, to drop thereinto under the effect of spring J44, or K44 respectively, whereby the three switches J41, J42, J43, or K41, K42, K43 respectively, are opened. As a result, the holding circuit of the relays 150 and 160 established by switch 43 and the motor circuit established by switch 41 are interrupted. The sheet fed into the typewriting or bookkeeping machine is accurately positioned by engagement of the tooth J46 or K46 respectively, with the notched wheel J21, or K21 respectively, so that the entry to be made will accurately register with the form printed on the record sheet.

*Ejection of the sheet after each entry*

When the operator wishes to eject the sheet after having effected the entry he must press the button 230 thereby closing the switch 231 and must return the paper carriage of the typewriting machine. During the return movement of the carriage the switch 236 will be closed establishing a circuit extending from positive line 300 via lines 308 and 324, switch 53, line 317, switch 164 which is now in resting position as shown in Fig. 15, lines 301 and 302, switch 236 just closed, line 303, normally closed relay switch 201 of relay 200, electromagnet 190, and line 304 to the negative line 305. In this circuit, the electromagnet 190 is energized and actuates the respective punch which marks the sheet at a point correlated to the line of the entry.

Moreover, the electromagnet 190 operates its relay switch 193 whereby a branch of the circuit just traced is established which extends from line 302 through switch 193, line 206, relay 200, and line 304 to the negative line 305. In this branch circuit the relay coil 200 is energized and caused to open its resting switch 201 and to close its relay switches 202 and 203. Opening of relay switch 201 causes the electromagnet 190 to be de-energized. The spring associated with its armature will withdraw the punch from the record sheet. The relay switch 202 establishes a holding circuit for the relay 200 which extends from the positive line 300 through lines 308 and 324, switch 53, line 317, switch 164, lines 301 and 302, switches 236 and 202, line 206, relay coil 200, and line 304 to the negative line 305.

The relay switch 203 of the relay 200 re-energizes the electromagnet 170 in a circuit extending from the positive line 300 through lines 308 and 324, switch 53, lines 317, switch 164, lines 301 and 302, relay switch 193 now returned to the position shown in Fig. 15, relay switch 203 just closed, line 306, normally closed relay switch 212, line 307, electromagnet 170, and the line 338 to the negative line 305. The electromagnet 170 closes its relay switch 171 and thereby establishes a holding circuit extending from the positive line 300 through lines 308 and 324, switch 53, line 317, switch 164, lines 301, 302 and 315, switch 231, line 318, switch 171, switch 163, line 319, magnet coil 170, and line 338 to the negative line 305. This holding circuit is required because otherwise the energization of magnet 170 would cause its circuit to be interrupted by the opening of the normally closed relay switch 212 as a result of the energization of relay 210 in a circuit extending from the positive line 300 through lines 308 and 324, switch 53, line 317, switch 164, lines 301, 302 and 315, switch 42 now closed by magnet 170, line 316, relay coil 210, and line 304 to the negative line 305. In this circuit, relay coil 210 is energized and opens its normally closed switch 212.

The magnet 170 causes the grooved detent wheel J21, or K21 respectively, to be unlocked by lever J40, or K40 respectively, and the three switches 41, 42 and 43 to be closed again whereby a circuit is closed extending from the positive line 300 through lines 308 and 309, switch 162 (which this time is in the resting position shown in Fig. 15 because of the de-energization of relay 160), line 310, switch 41, line 311, motor 30, lines 312 and 313, relay switch 161 (which, too, this time is in the position shown in Fig. 15), and line 314 to the negative line 305. As a result, the motor 30 is started in the reverse direction driving the feeding wheels and the control gear J24, or K24 respectively, in rearward direction contrary to the arrow, whereby ejection of the sheet or sheets is performed. While during this phase of the operation the relay coil 150 is de-energized permitting the support 125 of the sensing element to return to the position shown in Figs. 9 and 11, the sensing element 120 will not interfere with the ejecting movement of the sheet because it will fold upwardly out of the way of the sheet, as shown in Fig. 11. Circuit of relays 150 and 160 is open at 164.

From the foregoing explanation it will appear that it is the function of the relay 160 to determine the direction of rotation of the motor 30 depending on whether or not it is energized, and that it is the primary function of the magnet 170 to start or stop the motor by control of switch 41. It is the function of the auxiliary relay 200 to delay the ejection of the sheet until after the punch-actuating magnet 190 will have been de-energized and the punches will have been withdrawn from the sheet. At the commencement of the rearward feed switch 54 opens and de-energizes relay 180.

When the control gear J24, or K24 respectively, rotating in the direction contrary to the arrow approaches the initial position shown in Figs. 3, 4 and 15, its pin J80, or K80 respectively, will re-engage lever 51 from the other side and rock it into engagement with switch 53 so as to restore same to the normal opened condition, whereby the above-traced holding circuit for relays 150 and 160 is cut, and whereby relay 180 will be de-energized permitting its relay switch 181 to return to the normally closed position shown in Fig. 15. Moreover, the opening of switch 53 interrupts the circuits of magnet 170 permitting the detent tooth J46, or K46 respectively, to re-engage the detent wheel and permitting switch 41 to stop the motor. All of the elements are now returned to the original position.

*Line spacing after any entry*

Where a number of entries is to be made on the same record sheet or record sheets in consecutive lines thereof, the operator when returning the carriage will not press the button 231. It will be recalled that the above-traced circuit of electromagnet 170, as established following the punching operation for the purpose of starting the motor in reverse direction, includes a relay switch 212 which, however, is opened as a result of the energization of electromagnet 170, and that, in order to keep electromagnet 170 energized, a button 231 must be pressed by the operator, whereby a holding circuit is established. Shunted across the switch 231 is the cam-actuated switch 97 which at this time is in closed condition.

If the operator fails to press button switch 231, the electromagnet 170 will be de-energized again after having closed the three switches 41, 42 and 43 and having thus started the electric motor, the switches remaining closed temporarily by the lever J40, or K40 respectively, because its tooth J46, or K46 respectively, is out of alignment with the notches of the detent wheel J21, or K21 respectively, and is, therefore, locked in rocked condition. Therefore, the holding circuit will be interrupted as soon as the feed has been continued through one line space causing the cam wheel J25, or K25 respectively, to open contact 97. The circuit through motor 20 remains closed until the motor running in reverse direction will have turned the detent wheel J24, or K24 respectively, into the next position of registry of the tooth with a notch, whereupon spring J44, or K44 respectively, will rock lever J40, or K40 respectively, and will open the three contacts J41, J42, J43, or K41, K42, K43 respectively, to stop the motor. The cams of cam wheel 25 are so shaped as to keep contact 97 closed until the notched detent wheel J21, or K21 respectively, after energization of magnet 170 will have been turned through an angle sufficient to prevent the tooth 46 from re-engaging the notch from which is had been disengaged by energization of magnet 170. The motor is stopped when the paper has been fed one line space and the notched detent wheel has been turned in synchronism with the feeding motion to the angular position in which the spring J44, or K44 respectively, can re-engage the detent lever with the notched wheel.

Now the next entry may be made on the record sheet in the following line position. Thereafter, the operator will return the carriage either for a third entry—in this event he must not actuate button 230—or for an ejection of the sheet—in this event he must press button 230 to close press button switch 231.

Ejection of the record sheet without carriage return

If the operator wishes to eject the sheet or sheets without returning the carriage after having made any desired number of entries, he must press the button J240, or K240 respectively (Fig. 1). As a result, the switch 241 (Fig. 15) will be closed establishing a circuit for relay 220 which extends from the positive line 300 through lines 308 and 324, switch 53, line 317, switch 164, lines 301, 302 and 329, switch 241, relay coil 220, and line 304 to the negative line 305. The energization of relay coil 220 closes the normally open switch 221 which is shunted across press button switch 241 and, therefore, establishes a holding circuit for relay 220 after the operator has released the button 240.

Moreover, relay 220 closes its normally open switch 222 establishing a circuit extending from the positive line 300 through lines 308 and 324, switch 53, line 317, switch 164, line 301, switch 222 just closed, switch 163, line 319, electromagnet 170, and line 338 to the negative line 305. It will be noted that this circuit is independent of switch 231 and, therefore, will be closed irrespective of whether or not the carriage is returned. The electromagnet 170 attacts its armature causing switches 41, 42 and 43 to be energized and the grooved detent wheel to be unlocked. The switch 41 will start the electric motor J30, or K30 rspectively, in reverse direction whereby the sheet or sheets will be ejected. As soon as the control gear approaches the initial position shown in Fig. 15, it will act on switch lever J51, or K51 respectively, causing it to open switch 53 whereby the motor circuit is interrupted.

Introduction of a typed sheet

It will be recalled that when the parts are in the initial position the detector slide J102, or K102 respectively, is in its lowermost position in which the detector J103, or K103 respectively, is deflected from the path of the sheet and permits the leading edge of the sheet to pass the end J104, or K104 respectively, of the detector. As soon as the pin J80, or K80 respectively, releases the locking member J84, or K84 respectively, the spring J83, or K83 respectively, will rock lever J86, or K86 respectively, which in its turn will lift the detector slide thereby rendering the detector ready for operation. At the same time, the lever J86, or K86 respectively, will lift the lower contact of switch J110, or K110 respectively, thereby rendering same ready to be subsequently closed at the instant at which the detector enters a line mark punched into the record sheet and is pulled down by the record sheet. Closing of contact 110 establishes an electrical circuit extending from the positive line 300 through line 320, switch 110, line 326, relay coil 180, and line 314 to negative line 305. The relay 180 will open its normally closed switch 181 and will thus interrupt the aforetraced circuit of electromagnet 170 which extends from the positive line 300 through line 320, switch 181, line 322, switch 163, line 319, electromagnet 170, and line 338 to the negative line 305. As a result, the motor 30 will be stopped in the manner above described.

Ejection of the sheet after the last line has been filled out

It is desirable that the sheet be automatically ejected when it has been completely filled out. For this purpose, the control gear J24, or K24 respectively, is provided with the pin J260, or K260 respectively, which closes the contact 261 when the last line space on the sheet has been reached. When the operator, following the last entry, returns the carriage of the typewriting machine, the contact 251 is closed and this causes a circuit to be established which extends from the positive line 300 through lines 308 and 324, switch 53, line 317, switch 164, lines 301 and 328, switch 251, line 306, switch 261, relay coil 220, and line 304 to the negative line 305. As described above, the energization of relay 220 establishes a holding circuit for this relay through its switch 221, and through its switch 222 energizes the electromagnet 170 whereby the motor is started in reverse direction ejecting the sheet. This holding circuit keeps the motor running after switch 261 will have been disengaged by pin J260, or K260 respectively, and will have been permitted to return to its normal opened condition.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What we claim is:

1. Front feed apparatus for bookkeeping and typewriting machines comprising guide plates confining a guide slot for a record sheet, a paper feeding mechanism associated with said plates and adapted to engage and feed a record sheet introduced into said slot, driving means adapted to drive said mechanism, an electrical control member adapted to start said driving means, a movable sensing element projecting into said slot for engagement by said record sheet and connected with said control member and adapted to cause same to start said driving means in response to the introduction of a record sheet into said slot, and an actuator cooperatively connected with said control member and adapted to be rendered effective thereby and connected with said movable sensing element and adapted, when effective, to withdraw same from said slot in response to the introduction of a record sheet thereinto.

2. Front feed apparatus for bookkeeping and typewriting machines comprising guide plates confining a guide slot for a record sheet, a paper feeding mechanism associated with said plates and adapted to engage and feed a record sheet introduced into said slot, driving means adapted to drive said mechanism, an electrical control member adapted to start said driving means, a movable sensing element projecting into said slot for engagement by said record sheet and connected with said control member and adapted to cause same to start said driving means in response to the introduction of a record sheet into said slot, a magnet cooperatively connected with said control member and adapted to be energized thereby, and an armature adapted to be attracted by said magnet and connected with said movable sensing element and adapted to withdraw same from said slot in response to the introduction of a record sheet thereinto.

3. Front feed apparatus for bookkeeping and typewriting machines comprising guide plates confining a guide slot for a record sheet, a paper feeding mechanism associated with said plates and adapted to engage and feed a record sheet introduced into said slot, driving means adapted to drive said mechanism, an electrical control member adapted to start said driving means, a movable sensing element projecting into said slot for engagement by said record sheet and connected with said control member and adapted to cause same to start said driving means in response to the introduction of a record sheet into said slot, and an actuator connected with said sensing element and adapted, when effective, to withdraw same from said slot and adapted to be rendered effective by said sensing element.

4. Front feed apparatus for bookkeeping and typewriting machines comprising guide plates confining a guide slot for a record sheet, a paper feeding mechanism associated with said plates and adapted upon introduction of a sheet into said slot to engage and to feed said sheet in the direction of introduction, an electrical driving motor geared to said feeding mechanism, a starter switch for said motor, an electromagnet constituting a relay for actuation of said starter switch, an electrical switch adapted to energize said electromagnet, a movable sensing element projecting into said slot for engagement by said record sheet and connected with said electrical switch and adapted to cause same to control said relay for starting said motor in response to the introduction of a record sheet into said slot, and an armature operable by said electromagnet and connected with said movable sensing element and adapted to withdraw same from said slot when said electrical switch is actuated.

5. Front feed apparatus for bookkeeping and typewriting machines comprising guiding members confining a guide slot open at its top for introduction of a record sheet, paper feed wheels associated with said guiding members and located below said top at a distance therefrom and adapted to engage and feed a record sheet dropped into said slot, driving means adapted to drive said feed wheels, and a movable sensing element projecting into said slot at a point located above and closely spaced from said wheels and having a normally inclined face adapted to be engaged by a sheet dropped into said slot and movable thereby and adapted to act as a buffer for said sheet to check the impact caused by engagement of the latter with said feed wheels, said driving means being cooperatively connected with said sensing element to be started thereby in response to the introduction of said sheet into said slot.

6. Front feed apparatus for bookkeeping and typewriting machines comprising guide plates confining a guide slot for a record sheet, a paper feeding mechanism associated with said plates and adapted to engage and feed a record sheet introduced into said slot, driving means adapted to drive said mechanism, an electrical control member adapted to start said driving means, and a movable sensing element projecting into said slot for engagement by said record sheet and connected with said control member and adapted to cause same to start said driving means in response to the introduction of a record sheet into said slot, said movable sensing element comprising a support movable transversely to said slot from a normal position into a retracted position, a member pivotally mounted thereon and normally projecting into said slot when said support is in its normal position, and a stop mounted to cooperate with said support and said member so as to prevent said member from being rocked by said sheet in downward direction, said member being rockable in upward direction out of said slot with said support remaining in said normal position.

7. Front feed apparatus for bookkeeping and typewriting machines comprising guide members forming a guide slot for introduction of a record sheet, a feed wheel mounted on said members for engagement with said sheet and adapted to revolve in synchronism with the feed motion thereof in said slot, a control gear geared to said wheel and provided with a plurality of angularly distributed sockets, a control pin optionally insertable into any one of said sockets, and means mounted for engagement by said pin and adapted to arrest said wheel whereby said record sheet may be arrested in a position determined by said pin.

8. Front feed apparatus for bookkeeping or typewriting machines comprising a guide frame confining a guide slot for a record sheet, a punch mounted on said frame for marking the position of the last line typed upon said sheet upon introduction into said slot, a slide movably guided on said frame in the direction of introduction of said sheet and having a detector projecting into said slot and adapted to engage a mark produced by said punch to detect the position of the last line of the sheet upon re-introduction into said slot, a paper feeding mechanism adapted to engage and to feed said record sheet introduced into said slot, driving means adapted to drive said mechanism, and an electrical switch mounted on said frame in position for control by said slide and connected with said driving means for stopping the same in a position depending on the location of said mark.

9. Front feed apparatus for bookkeeping and typewriting machines comprising guide plates confining a guide slot for a record sheet, a paper feeding mechanism associated with said plates and adapted to engage and feed a record sheet introduced into said slot, driving means adapted to drive said mechanism, an electrical control member adapted to start said driving means, a movable sensing element projecting into said slot for engagement by said record sheet and connected with said control member and adapted to cause same to start said driving means in response to the introduction of a record sheet into said slot, and a line spacing mechanism formed by a notched wheel geared to said paper feeding mechanism, the notches of said wheel being circumferentially spaced in accordance with the line spacing of the record sheet, by a detent adapted to engage and to arrest said notched wheel, and by means for temporarily disengaging said detent and simultaneously starting said driving means.

10. Front feed apparatus for bookkeeping and typewriting machines comprising a frame, guiding members mounted thereon confining a guide slot for a record sheet, a paper feeding mechanism mounted in said frame and adapted to engage and feed a record sheet introduced into said slot, an electric motor and a notched wheel both geared to said paper feeding mechanism, the notches of said wheel being circumferentially spaced in accordance with the line spacing of the record sheet, a detent mounted on said frame for engagement with said notched wheel, a first switch operable by said detent and adapted to start said electric motor upon disengagement of the detent and to stop it upon engagement thereof with a notch of said wheel, an actuator mounted on said frame and cooperatively connected with said detent and adapted, when active, to disengage said detent, a second switch adapted to inactivate said actuator, and a rotary cam wheel geared to said mechanism and adapted after actuation of said first switch to actuate said second switch for inactivation of said actuator, when the same has caused said notched wheel to be driven out of registry of said notches with said detent whereby the detent is conditioned for re-engagement and stoppage of the motor after completion of a line spacing feed.

11. Front feed apparatus as claimed in claim 8 in which said punch has a semi-circular cutting edge for marking said sheet by punching out a scale-like portion which remains coherent at its basis with the sheet.

12. Front feed apparatus for a bookkeeping or typewriting machine comprising a frame shaped for mounting on the carriage of said machine, said frame confining a guide slot for a record sheet, a paper feeding mechanism mounted on said frame and adapted to engage and feed a record sheet introduced into said slot in the direction of introduction, power-driven means adapted to drive said mechanism, reversing means for said power-driven means, a line spacing mechanism mounted on said frame and adapted to control said power-driven means upon reversal thereof for line-spacing said record sheet contrary to the direction of introduction, a punch mounted on said frame in operative relationship to said slot for marking the position of the last line typed upon said sheet, an actuating mechanism for said punch, and means mounted on said frame and responsive to the carriage return movement of the typewriting machine and adapted to render said actuating mechanism effective.

13. Front feed apparatus as claimed in claim 12 in which said actuating mechnism for said punch is so cooperatively associated with said line spacing mechanism as to put same in operation after said punch has been actuated.

14. Front feed apparatus as claimed in claim 8 in which said detector projecting into the slot is constituted by a leaf spring carried by said slide and adapted to yieldingly slide on said sheet to engage said mark therein and to couple said slide to said sheet.

15. Front feed apparatus as claimed in claim 8 in which said detector projecting into said slot is constituted by a leaf spring carried by said slide and adapted to yieldingly slide on said sheet to engage said mark therein, said frame being provided with a deflector mounted for cooperation with said leaf spring, when said slide is in its end position, and to deflect said leaf spring into inactive position out of the path of said sheet permitting the leading edge of the sheet upon introduction of the latter to pass said leaf spring without actuating said slide.

16. Front feed apparatus for bookkeeping or typewriting machines comprising a frame provided with a guide slot, a paper feeding mechanism mounted on said frame and adapted to engage and feed a record sheet introduced into said slot through the same, a motor adapted to drive said mechanism, means for starting and stopping said motor, a slide guided on said frame for movement parallel to said slot in the feeding direction of said paper feeding mechanism, a detector carried by said slide and adapted to project into said slot and to slide on said sheet and to engage a mark punched therein, a control gear geared to said paper feeding mechanism and provided with a plurality of angularly distributed sockets, a control pin optionally insertable into any one of said sockets, means mounted on said frame for engagement by said pin and connected with said first-mentioned means to stop said motor, a deflector mounted on said frame and adapted to deflect said detector out of said slot when said slide is in one of its end positions, actuating means mounted on said frame and adapted when effective to move said slide from said one of its end positions, a locking mechanism associated with said actuating means and said control gear and adapted to lock said actuating means in ineffective position and to be released by said gear to render said actuating means effective when said control gear arrives at a predetermined angular position, and an electrical switch mounted on said frame in position for actuation by said slide and electrically connected with said first-mentioned means so as to stop said motor, if said detector engages a mark punched in said sheet and together with the slide is carried along by said sheet.

17. Front feed apparatus as claimed in claim 8 in which said electrical switch comprises a pair of contact-carrying springs, and in which a spring is provided tending to move said slide into one of its end positions, said slide being so mounted as to be adapted in said end position to deflect one of said springs away from the other one of said springs.

18. Front feed apparatus as claimed in claim 16 in which said electrical switch comprises a pair of cooperating contact-carrying springs, one spring being adapted to be flexed by said slide and the other spring being adapted to be flexed by said actuating means.

References Cited in the file of this patent
UNITED STATES PATENTS

| | | |
|---|---|---|
| 2,111,619 | Fleming | Mar. 22, 1938 |
| 2,282,127 | Gabbert | May 5, 1942 |
| 2,357,455 | Bryce | Sept. 5, 1944 |
| 2,675,904 | Maurer | Apr. 20, 1954 |